United States Patent
Kravitz

Patent Number: 5,231,668
Date of Patent: Jul. 27, 1993

[54] DIGITAL SIGNATURE ALGORITHM

[75] Inventor: David W. Kravitz, Owings Mills, Md.

[73] Assignee: The United States of America, as represented by the Secretary of Commerce, Washington, D.C.

[21] Appl. No.: 736,451

[22] Filed: Jul. 26, 1991

[51] Int. Cl.$^5$ .............................................. H04K 1/00
[52] U.S. Cl. ........................................ 380/28; 380/30
[58] Field of Search ................................... 380/28, 30

[56] References Cited

U.S. PATENT DOCUMENTS

| | | | |
|---|---|---|---|
| 4,200,770 | 4/1980 | Hellman | 380/30 |
| 4,218,582 | 8/1980 | Hellman | 380/30 |
| 4,405,829 | 9/1983 | Rivest | 380/30 |
| 4,424,414 | 1/1984 | Hellman | 380/30 |
| 4,641,346 | 2/1987 | Clark | 380/51 |
| 4,748,668 | 5/1988 | Shamir et al. | 380/30 |
| 4,881,264 | 11/1989 | Merkle | 380/28 |
| 4,933,970 | 6/1990 | Shamir | 380/30 |
| 4,995,082 | 2/1991 | Schnorr | 380/30 |
| 5,005,200 | 4/1991 | Fischer | 380/30 |
| 5,097,504 | 3/1992 | Camion et al. | 380/30 |

OTHER PUBLICATIONS

C. P. Schnorr, letter (8 pages) to Director, Computer Systems Laboratories, Attn: Proposed FIPS, Oct. 30, 1991.

El Gamal, Taher, "A Public Key Cryptosystem and a Signature Scheme Based on Discrete Logarithms", lIII Transactions and Information Theory, vol. IT-31, No. 4, Jul. 1985.

*Primary Examiner*—Salvatore Cangialosi
*Attorney, Agent, or Firm*—Schnader, Harrison, Segal & Lewis

[57] ABSTRACT

A method is provided for generating and verifying a digital signature of a message m. This method requires a pair of corresponding public and secret keys (y and x) for each signer, as well as a pair of public and secret values (r and k) generated for each message by the signer. The public value r is calculated according to the rule $r = (g^k \bmod p) \bmod q$. A value s is then selected according to the rule $s = k^{-1}(H(m) + xr) \bmod q$ where H is a known conventional hashing function. The message m, along with the signature (r,s) is then transmitted. When the transmitted signal is received a verification process is provided. The received values of r and s are tested to determine whether they are congruent to 0 mod g. Additionally, r is tested to determine whether it is equal to v mod q, where v is computed from r, s, m and y. For legitimately executed signatures, $v = g^k \bmod p$.

44 Claims, 3 Drawing Sheets

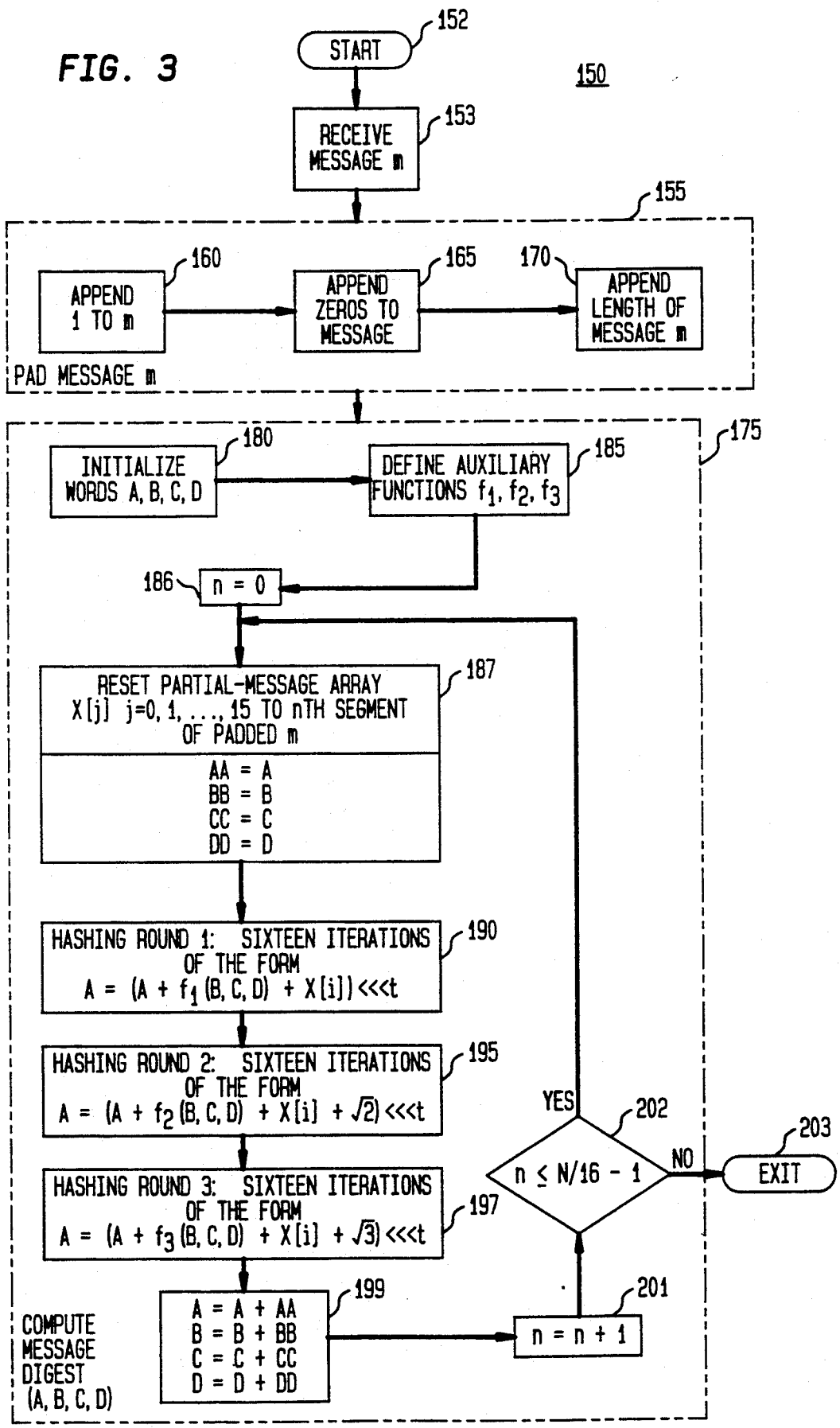

DIGITAL SIGNATURE ALGORITHM

BACKGROUND OF THE INVENTION

1) Field of the Invention

The field of this invention is data integrity, and in particular generating and verifying a digital signature for a message or data file.

2) Background Art

When a message is transmitted from one party to another, the receiving party may desire to determine whether the message has been altered in transit. Furthermore, the receiving party may wish to be certain of the origin of the message. It is known in the prior art to provide both of these functions using digital signature algorithms. Several known digital signature algorithms are available for verifying the integrity of a message. These known digital signature algorithms may also be used to prove to a third party that the message was signed by the actual originator.

The use of public key cryptography to achieve instantiations of these digital signature algorithms is also known in the art. For example, Diffie and Hellman teach using public key cryptography to derive a digital signature algorithm in "New Directions in Cryptography," IEEE Transactions on Information Theory, Vol. IT-22 pp. 472–492, 1976. See also U.S. Pat. No. 4,200,770. Since then, several attempts have been made to find practical public key signature techniques which depend on the difficulty of solving certain mathematical problems to make message alteration or forgery by unauthorized parties difficult. For example, the Rivest-Shamir-Adleman system depends on the difficulty of factoring large integers. See R. Rivest, A. Shamir, and L. Adleman, "A Method for Obtaining Digital Signatures and Public Key Cryptosystems," Communications of the ACM, Feb. 1978, Vol. 21, No. 2, pp. 120–126, and U.S. Pat. No. 4,405,829.

Taher ElGamal teaches a signature scheme in "A Public Key Cryptosystem and a Signature Scheme Based on Discrete Logarithms" in IEEE Transactions on Information Theory, Vol. IT-31, No. Jul. 4, 1985. It is believed that this system relies on the difficulty of computing discrete logarithms over finite fields. In the system taught by ElGamal m denotes a document to be signed, where $0 \leq m \leq p-2$ where p is a large prime and $\alpha$ is a primitive element mod p, both known. In any of the cryptographic systems based on discrete logarithms, p must be chosen such that $p-1$ has at least one large prime factor. If $p-1$ has only small prime factors, then computing the discrete logarithms is easy. The public file consists of a public key $y \equiv \alpha^x \mod p$ for each user where each user has a secret x, a large prime p, and a primitive element $\alpha$. To sign a document, user A uses a secret key $x_A$ to find a signature for m in such a way that all users can verify the authenticity of the signature by using the public key $y_A$ together with $\alpha$ and p, and no one can forge a signature without knowing the secret $x_A$.

The signature for m is the pair (r,s), $0 \leq r, s < p-1$, chosen such that $$\alpha^m \equiv y^r r^s \mod p \qquad \text{Equation (1)}$$

is satisfied.

In many applications it is convenient or necessary to sign the message on-line. However, the Rivest-Shamir-Adleman system is expensive to sign on-line. The system of ElGamal, however, allows much of the computation to be done prior to going on-line since use is made of values which are not dependent upon message m. Thus, on-line signature generation is very simple in the system of ElGamal.

The signing procedure in the method taught by ElGamal includes three steps. In the first step, a random number k is chosen such that k is uniformly between 0 and $p-1$, and $\gcd(k, p-1) = 1$. Next, r is determined by the relationship $$r \equiv \alpha^k \mod p. \qquad \text{Equation (2)}$$

In view of Equation (2), the relationship which must be satisfied for determining the signature for message m, as set forth in Equation (1), may be written as $$\alpha^m \equiv \alpha^{xr} \alpha^{ks} \mod p. \qquad \text{Equation (3)}$$

Equation (3) may be solved for s by using $$m \equiv xr + ks \mod (p-1). \qquad \text{Equation (4)}$$

Equation (4) has a solution for s provided k is chosen such that $\gcd(k, p-1) = 1$.

In the method taught by ElGamal it is easy to verify the authenticity of the signature (r,s) by computing both sides of Equation (1) and determining that they are equal. The chosen value of k should never be used more than once. This can be guaranteed, for example, by using a Data Encryption Standard chip in the counter mode as a stream cipher to generate values of k.

It is possible to attempt two types of attacks on the signature scheme of ElGamal. The first type of attack includes attacks designed to recover the secret key x. The second type of attack includes attacks designed to forge signatures without recovering x. Some of these attempted attacks are easily shown to be equivalent to computing discrete logarithms over GF(p).

In the first type of attack attempt an intruder may try to solve t equations of the form of Equation (4) when given $\{m_i: i = 1, 2, \ldots, t\}$ documents, together with the corresponding signatures $\{(r_i, s_i): i = 1, 2, \ldots, t\}$. However, there are $t+1$ unknowns in this system of equations since each signature uses a different value of k. Thus, this system of equations is underdetermined and the number of solutions is large. The reason is that each value of x yields a solution for the $k_i$ since a system of linear equations with a diagonal matrix of coefficients results. Since $p-1$ is chosen to have at least one large prime factor q, potential recovery of x mod q would require an exponential number of message-signature pairs. If any value of k is used twice in the signing, then the system of equations is uniquely determined and x may be recoverable. Thus, for the system of ElGamal to be secure, no value of k should be used more than once, as previously described.

In another attack attempt of this first type an intruder may try to solve equations of the form of Equation (3). This is always equivalent to computing discrete logarithms over GF(p), since both unknowns x and k appear in the exponent. In still another attack of this type an intruder may attempt to develop some linear dependencies among the unknowns $\{k_i, 2, \ldots, t\}$. This is also equivalent to computing discrete logarithms since if $k_i \equiv c k_j \mod (p-1)$, then $r_i \equiv r_j^c \mod p$, and if c can be computed then computing discrete logarithms is easy.

In the second type of attack attempt, trying to forge signatures without knowledge of x, a forger may try to find r and s such that Equation (1) is satisfied for a document m. If $r \equiv \alpha^j \bmod p$ is fixed for some j chosen at random, then computing s is equivalent to solving a discrete logarithm problem over GF(p).

If the forger fixes s first, then r may be computed as follows:

$$r^s y^r \equiv A \bmod p. \qquad \text{Equation (b)}$$

Solving Equation (5) for r may not be as hard as computing discrete logarithms. However, it is believed that solving Equation (5) in polynomial time is not feasible. In another possible attack of the second type, a forger may try to solve Equation (1) for both r and s simultaneously. However, it is believed that an efficient algorithm for doing so is not known.

The signature scheme of ElGamal also permits an attack attempt wherein the intruder, knowing one legitimate signature (r,s) for one message m, may generate other legitimate signatures (r,s) and messages m. However, this attack attempt, although implementable, does not allow the intruder to sign an arbitrary message m and therefore does not break the system. This limited ability to create acceptable message-signature pairs can be avoided by requiring m to have a certain structure. Alternatively this can be avoided by applying a one-way function H to message m before signing it. This causes a potential forger to be unable to determine a value of m which corresponds to the H(m) which was signed using the method shown below. The forger must be able to transmit such an m to the verifier, if the forgery is to be considered successful.

Given a signature (r,s) for the legitimately signed message m, then $$\alpha^m \equiv y^r r^s \bmod p.$$

Integers A, B, and C are selected by the forger arbitrarily such that (Ar−Cs) is relatively prime to p−1. The values of r', s', m' are selected such that $$r' = r^A \alpha^B y^C \bmod p,$$

$$s' = sr'/(Ar-Cs) \bmod (p-1),$$

$$m' = r'(Am+Bs)/(Ar-Cs) \bmod (p-1).$$

Then it is claimed that (r',s') signs the message m': The verification equation will be satisfied, since $$\begin{aligned} y^{r'}r'^{s'} &\equiv y^{r'}(r^A \alpha^B y^C)^{sr'/(Ar-Cs)} \\ &\equiv (y^{r'Ar-r'Cs+r'Cs} r^{Asr'} \alpha^{Bsr'})^{1/(Ar-Cs)} \\ &\equiv ((y^r r^s)^{Ar'} \alpha^{Bsr'})^{1/(Ar-Cs)} \\ &\equiv \alpha^{(mAr'+Bsr')/(Ar-Cs)} \\ &\equiv \alpha^{m'} \end{aligned}$$

wherein all calculations are performed mod p.

As a special case, setting A=0, verifiable signatures (r',s') may be generated with corresponding messages m', without access to any signature:

$$r' = \alpha^B y^C \bmod p,$$

$$s' = -r'/C \bmod (p-1),$$

$$m' = -r'B/C \bmod (p-1).$$

Thus it will be understood by those skilled in the art that applying a one-way function H to message m, prior to signing, thwarts the general and special-case attack attempts. It will also be understood that function H may be used to form a digest of long messages so that the signature function does not have to be iteratively applied to segments of the full message m. This results in further efficiency.

U.S. Pat. No. 4,995,082, issued to Schnorr, on Feb. 19, 1991, entitled "Method for Identifying Subscribers and for Generating and Verifying Electronic Signatures in a Data Exchange System," provides a system wherein communication and verification is more efficient relative to ElGamal. Additionally, the system of Schnorr maintains the extremely efficient on-line signing capability. However, some of the desirable features of ElGamal, as well as the extensive body of experience and literature associated with the ElGamal model, are not applicable to the Schnorr model.

Thus, it is desirable to provide a system having efficiencies of on-line signing, communication, and verification which are comparable to the system of Schnorr while still maintaining compatibility with the ElGamal model and its analytical tools. In particular, it is desirable to retain the complexity of the ElGamal signature equation which enables secure use of the straightforward expression H(m), rather than simplifying the signature equation at the expense of replacing H(m) by Schnorr's H($\alpha^k \bmod p$,m).

SUMMARY OF THE INVENTION

A method is provided for generating and verifying a digital signature of a message m. This method requires a pair of corresponding public and secret keys (y and x) for each signer, as well as a pair of public and secret values (r and k) generated for each message by the signer. The public value r is calculated according to the rule $r = (g^k \bmod p) \bmod q$. A value s is then selected according to the rule $s = k^{-1}(H(m) + xr)$ where H is a known conventional hashing function. The message m, along with the signature (r,s) is then transmitted. When the transmitted signal is received a verification process is provided. The received values of r and s are tested to determine whether they are congruent to 0 mod q. Additionally, r is tested to determine whether it is equal to v mod q, where v is computed from r, s, m and y. For legitimately executed signatures, $v = g^k \bmod p$.

BRIEF DESCRIPTION OF THE DRAWINGS

FIG. 3 shows a hashing algorithm suitable for use within the digital signature algorithm of FIGS. 1, 2.

DETAILED DESCRIPTION OF THE INVENTION

Figure 1:
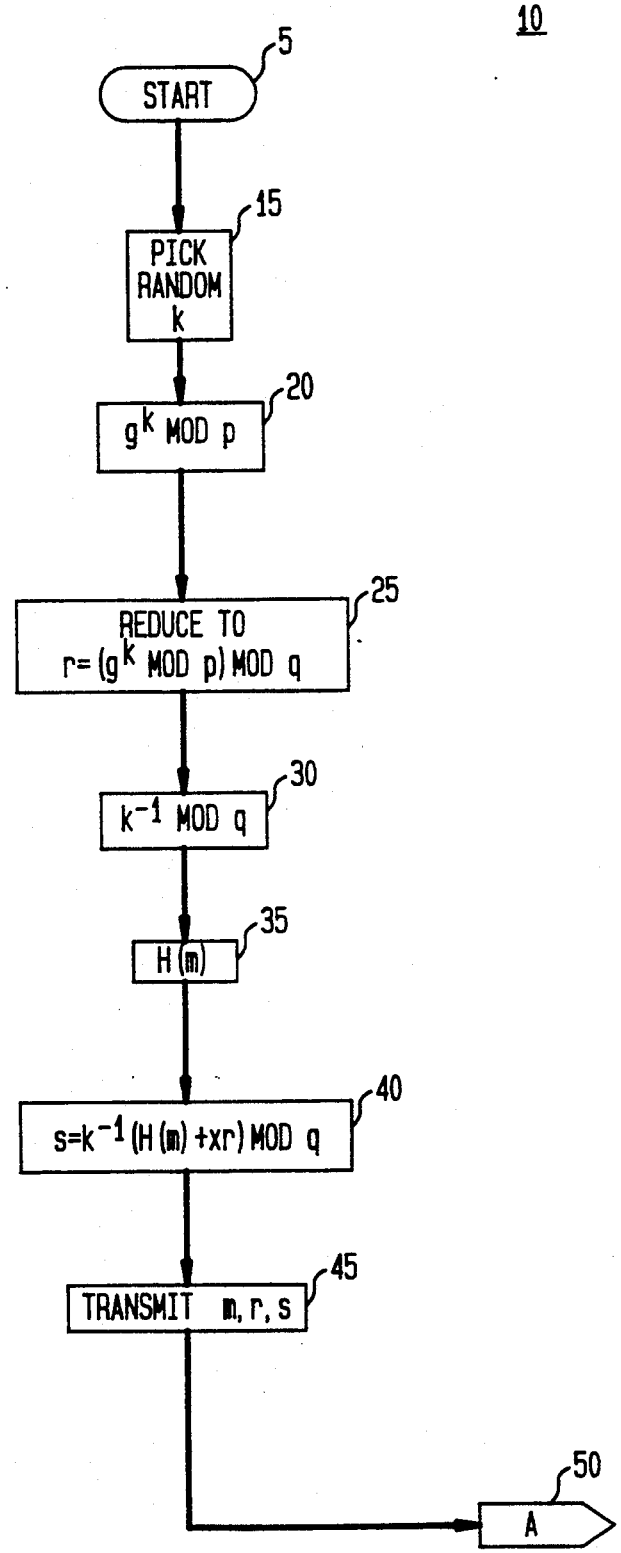
FIGS. 1, 2 show the digital signature algorithm of the present invention.
Figure 2:
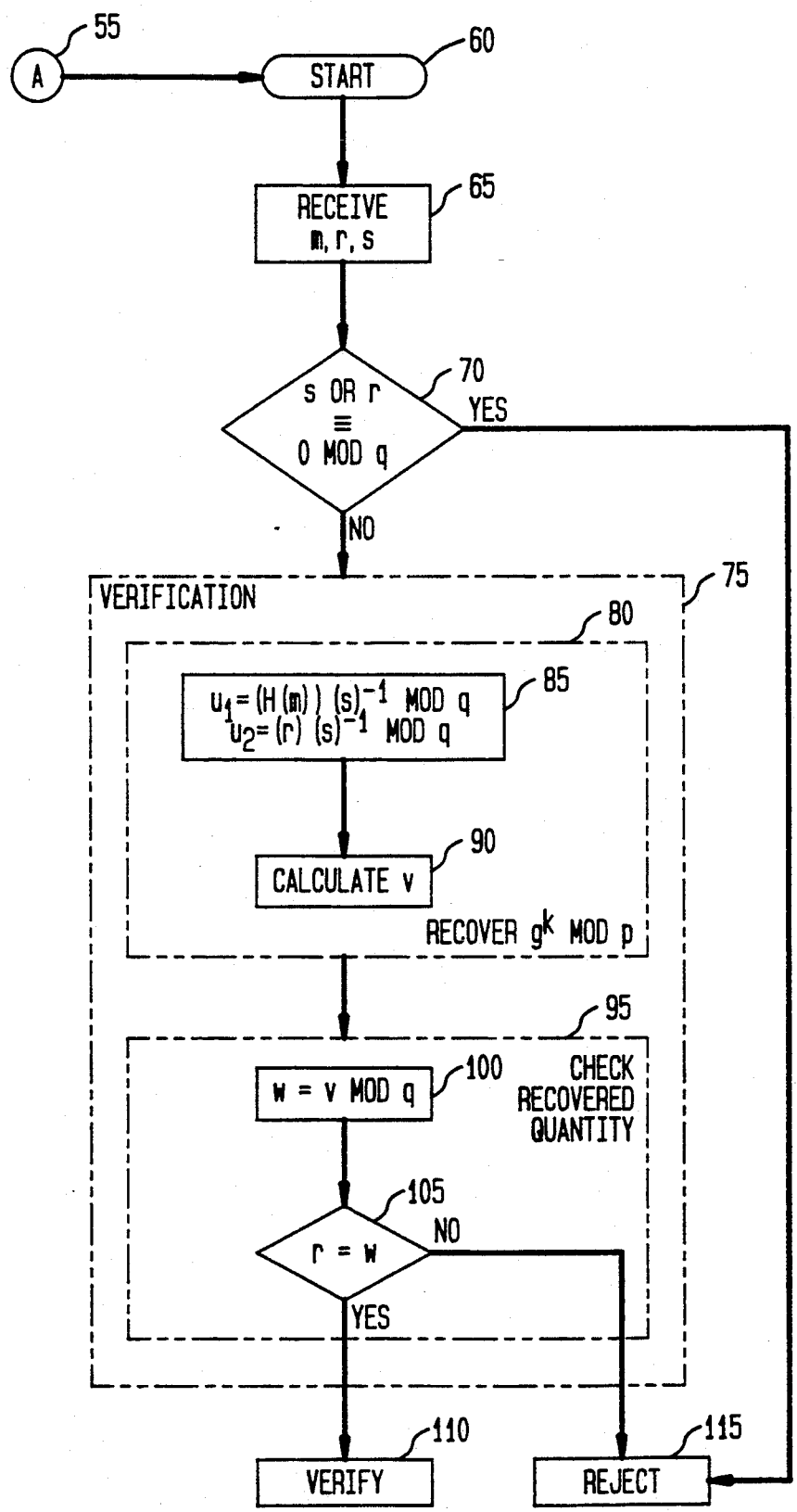

Referring now to FIGS. 1, 2, there is shown digital logorithm 10. In digital signature algorithm 10, the two keys in a pair of private and public keys are used respectively to generate and verify digital signatures (r,s)', each of which corresponds to a transmitted message m. Using digital signature algorithm 10 the holder of a private key may generate a digital signature for message m where message m may contain any amount of data. A holder of the corresponding public key may then receive message m and verify the signature (r,s). An intruder who does not know the private key cannot generate the signature (r,s) of the holder of the private key for any message m and therefore signatures (r,s) cannot be forged. An intruder also cannot alter any signed message m without invalidating the signature (r,s).

If digital signature algorithm 10 is to be used effectively, a means of associating a public and private key pair with each signer is required. There must be a binding of information identifying the signer with the corresponding public key. In order to insure that each private key or secret key is held by the individual whose identity is bound to the corresponding public key, this binding must be certified by a mutually trusted third party. For example, a certifying authority may sign credentials containing the public key of a user of digital signature algorithm 10 and the identity of the user to form a certificate.

Execution of digital signature algorithm 10 of the present invention begins at start terminal 5. A user of digital signature algorithm 10 first selects a secret value of k as shown in block 15. The selected k is a secret integer generated by the signer for each message m. The value of k is chosen such that $0<k<q$. The k of digital signature algorithm 10 may be generated in a random or pseudo-random fashion. It will be understood by those skilled in the art that the pseudo-random generation of integer k may be performed in any conventional manner.

In block 20 of digital signature algorithm 10 a determination is made of $g^k \bmod p$. It is known in the art to determine the quantity of block 20 and transmit this quantity. However, this quantity can be quite long. Therefore, in block 25, the quantity of block 20 is reduced to a one hundred sixty bit image by reducing it mod q as follows $$r = (g^k \bmod p) \bmod q. \qquad \text{Equation (6)}$$

In order to generate r as set forth in Equation (6), the value g is determined as follows:

$$g = h^{(p-1)/q} \bmod p, \qquad \text{Equation (7)}$$

where h is any non-zero integer mod p such that $h^{(p-1)/q}$ is not congruent to 1 mod p. The value g may be common to all users of digital signature algorithm 10. In Equation (6), p is a prime modulus, where $2^{511} < p < 2^{512}$. The prime modulus p may be common to all users of digital signature algorithm 10. The value q is a prime divisor of (p-1), where $2^{159} < q < 2^{160}$. q may also be common to all users of digital signature algorithm 10.

Execution of digital signature algorithm 10 then proceeds to block 30 where the quantity $k^{-1} \bmod q$ is determined. This value will be useful in the determination of the signature for transmission within the system of digital signature algorithm 10. It will be understood by those skilled in the art that all of the operations performed within digital signature algorithm 10 up to and including the computation of block 30 are independent of message m. Thus, these computations may be made off-line, thereby permitting a greatly shortened on-line signing procedure.

Execution of digital signature algorithm 10 then proceeds to block 35 wherein message m is hashed. This hashing of message m performed in block 35 provides an output of one hundred sixty bits or less, denoted by H(m). Many conventional hashing algorithms, suitable for hashing message m as shown in block 35 of algorithm 10, are known in the prior art. Additionally, it will be understood that the message to which the hashing algorithm is applied may be in an unencrypted form.

When r and $k^{-1} \bmod q$ are determined as set forth in Equations (6) and (7), the value of s for message m may be determined as shown in block 40 of digital signature algorithm 10:

$$s = k^{-1}(H(m) + xr) \bmod q. \qquad \text{Equation (8)}$$

The solution of Equation (8) of block 40 of digital signature algorithm 10 also results in a one hundred sixty bit integer. The values r and s thus determined respectively in blocks 25, 40, constitute the signature (r,s) of message m. They are transmitted along with message m to the recipient as shown in block 45. It will be understood that m may be transmitted in an unencrypted form. Execution of algorithm 10 then proceeds by way of off-page connector 50.

Within digital signature algorithm 10, each signer is provided with a secret key x, where $0<x<q$. A secret key x is fixed for all messages m transmitted by an individual user of algorithm 10. Additionally, public key y is provided to the user holding the secret key x or secret value x, where $y = g^x \bmod p$. Prior to verifying a signature (r,s), the public key y and the identity of the signer who possesses the corresponding secret key x must be available to the recipient in an authenticated manner, where the ultimate purpose of verification is to prove that (r,s) was originally created by one who had knowledge of the value of x which corresponds to the particular value of y. If x has not been compromised, this signer is known to be the one whose identity is linked to the particular y in an authenticated manner. Additionally, the recipient must know the global values g, p and q.

Execution of algorithm 10 then proceeds by way of on-page connector 55 to start terminal 60. After receiving message m as shown in block 65, along with its purported signature (r,s), the recipient within the system of the present invention must verify both the received r and the received s. It will be understood therefore that within digital signature algorithm 10 the prior art kernel $g^k \bmod p$ is reduced mod q and transmitted. $g^k \bmod p$ is then recovered and verified within algorithm 10. Thus, using the system of the present invention, the prior art $g^k \bmod p$ may be reconstructed at the receiving end rather than transmitted by the sender.

Therefore, a determination is made at decision diamond 70 of algorithm 10 whether either s or r is congruent to 0 mod q. If either r or s is congruent to 0 mod q, then execution proceeds to block 115 and the received signature (r,s) is rejected by digital signature algorithm 10. If r and s are not congruent to 0 mod g, then the recipient proceeds with verification of the received signature (r,s) as shown in dashed verification box 75.

Digital signature algorithm 10, upon entering dashed verification block 75, recovers $g^k \bmod p$ as shown in dashed recovery block 80. It is known in the art to recover $g^k \bmod p$ after receiving a transmitted message because many prior art methods transmitted $g^k \bmod p$ without any reducing prior to transmission. Within recovery block 80, the values of $u_1$ and $u_2$ are determined as shown in block 85. The values of block 85 are determined as $u_1 = (H(m))(s)^{-1} \bmod q$, and $u_2 = (r)(s)^{-1} \bmod q$. Determination of the values $u_1$ and $u_2$ permits a determination of $g^k \bmod p$ from $u_1$, $u_2$, and y as set forth in Equation (9). This determination is shown in block 90. It will be understood by those skilled in the art that it is not known at this point whether the quantity recovered in block 90 is a legitimate $g^k \mod p$. However, execution of digital signature algorithm 10 proceeds on the assumption that it is legitimate and checks this assumption.

$$v = (g)^{u1}(y)^{u2} \mod p \qquad \text{Equation (9)}$$
$$[ = ((g^{H(m)})(y^r))^{s-1} \mod p$$
$$= (g^{H(m)+xr})^{k(H(m)+xr)-1} \mod p$$
$$= g^k \mod p].$$

Within dashed checking block 95, the recovered quantity $g^k \mod p$ of Equation (9) is checked by first determining the value of w as shown in block 100. The value of block 100 is determined as $w = v \mod q$. In decision diamond 105 a determination is made as to whether the received value of r is equal to the mod q reduced value of $g^k \mod q$, where m,k,r and s satisfy the relationship set forth in Equation (8), for the given value of y. If the determination of decision 105 is affirmative, execution proceeds to verify block 110 where the signature (r,s) received in block 65 is considered verified by digital signature algorithm 10. If the determination of decision diamond 105 is negative, execution proceeds to reject box 115 where the received signature (r,s) is rejected.

The security of digital signature algorithm 10 is dependent upon maintaining the secrecy of private keys. Users of digital signature algorithm 10 must therefore guard against the unauthorized disclosure of their private keys. In addition, the hash function p of block 35 used to determine the value of s must be selected such that it is computationally infeasible to find any message m which has a given hash value. Likewise, it should be computationally infeasible to find any pair of distinct messages m which hash to the same value.

Referring now to FIG. 3, there is shown hashing algorithm 150. A conventional algorithm such as algorithm 150 may be found, for example, in R. L. Rivest, "The MD4 Message Digest Algorithm," Abstracts Crypto '90, pp. 281-291. As previously described, the signature and verification processes within digital signature algorithm 10 require a secure hash algorithm which takes an arbitrary length message as input and outputs a hash value of length one hundred sixty bits or less. Hashing algorithm 150 is suitable for performing the hashing function of digital signature algorithm 10 as set forth in block 35. It will be understood by those skilled in the art that conventional hashing functions other than hashing algorithm 150 may also be used to perform the hashing function of block 35 within digital signature algorithm 10.

Execution of hashing algorithm 150 proceeds from block 30 of digital signature algorithm 10 and begins at start terminal 152. Hashing algorithm 150 then receives as its input a b-bit message m to be hashed as shown in block 153 and operates to provide a message digest A, B, C, D as its output. The number of bits p in the message m received in block 153 is an arbitrary non-negative integer. The value of p may be zero and it need not be a multiple of eight. Furthermore, b may be arbitrarily large. The bits of message m may be described as follows:

$$m_0 m_1 \ldots m_{b-1}.$$

The next step of hashing algorithm 150 is padding or extending message m so that its length in bits is congruent to 448, modulo 512, as shown in dashed padding block 155. Thus, message m is extended so that it is just sixty-four bits short of being a multiple of five hundred twelve bits long. Padding of message m must always be performed within hashing algorithm 150, even if the length of message m is already congruent to 448, modulo 512. In the case where the length of message m is already congruent to 448, modulo 512, five hundred twelve bits of padding are added in dashed padding block 155.

In the padding of message m set forth in padding block 155, a single bit having a value of one is appended to message m as shown in block 160 within padding block 155. Then enough zero bits are appended to message m to cause the length in bits of padded message m to become congruent to 448, modulo 512 as shown in block 165. The padding operation of padding block 155 is thus invertible so that different inputs yield different outputs. The padding operation of dashed padding block 155 would not be invertible if it were done only with zeros.

Execution of hashing algorithm 150 then proceeds to block 170, where a sixty-four bit representation of p is appended to the result of the appending operations of blocks 160, 165. It will be understood that p is the length of message m before the padding bits are added as set forth in blocks 160, 165. This sixty-four bit representation is appended as two thirty-two bit words, low-order word first. In the unlikely event that p is greater than $2^{64}$, then only the low-order sixty four bits are appended in block 170. At this stage in the execution of hashing algorithm 150, the resulting padded message has a length that is an exact multiple of five hundred twelve bits. Equivalently, this padded message has a length that is an exact multiple of sixteen words where each word is understood to be thirty-two bits(.) Let M[u], $0 \leq u \leq N-1$, denote the words of the message resulting from processing in block 170, where p is a multiple of sixteen.

Execution of hashing algorithm 150 then proceeds to dashed message digest block 175 where a four word buffer is used to compute the message digest A, B, C, D. Each of the four words of the message digest A, B, C, D is a thirty-two bit register. In block 180 of message digest block 175 these registers are initialized to the hexadecimal values shown in Table I, low-order bytes first.

TABLE I

| Word A: | 01 | 23 | 45 | 67 |
|---|---|---|---|---|
| Word B: | 89 | ab | cd | ef |
| Word C: | fe | dc | ba | 98 |
| Word D: | 76 | 54 | 32 | 10 |

Three auxiliary functions $f_1$, $f_2$, $f_3$, are then defined as shown in block 185. The auxiliary functions $f_1$, $f_2$, $f_3$, are set forth in Table II. Each auxiliary function $f_1$, $f_2$, $f_3$, of Table II receives as input three thirty-two bit words X, Y, Z and produces as output one thirty-two bit word $f_1(X,Y,Z)$, $f_2(X,Y,Z)$, and $f_3(X,Y,Z)$ respectively.

TABLE II $$f_1(X, Y, Z) = XY \vee (\neg X)Z$$

TABLE II-continued $$f_2(X, Y, Z) = XY \lor XZ \lor YZ$$
$$f_3(X, Y, Z) = X \oplus Y \oplus Z$$

In each bit position of the input words X, Y, Z the auxiliary function $f_1$ acts as a conditional to implement the condition: if X then Y else Z. In each bit position the auxiliary function $f_2$ acts as a majority function: if at least two of X, Y, Z have a value of one, then $f_2$ has a one in that bit position. The auxiliary function $f_3$ applies the bit-wise exclusive OR or parity function to each bit position. If the bits of X, Y, and Z are independent and unbiased, then each bit of $f_1(X,Y,Z)$ is independent and unbiased. Similarly the auxiliary functions $f_2(X,Y,Z)$ and $f_3(X,Y,Z)$ are independent and unbiased if the bits of X, Y, and Z are independent and unbiased.

Hashing algorithm 150 initializes the loop induction variable n to zero in block 186, and then sets the current values of the array X[j] for $0 \leq j \leq 15$ in block 187 and performs a set of three rounds of hashing as shown in blocks 190, 195, 197, where array X[j] is updated and three rounds of hashing are performed a total of N/16 times. In rounds two and three, hashing algorithm 150 uses constants. The round two constant is the square root of two and the round three constant is the square root of three. The values of these constants, with high-order digits given first, are set forth in Table III.

TABLE III

| | Octal | Hex |
|---|---|---|
| Round 2 constant ($\sqrt{2}$) | 013240474631 | 5A827999 |
| Round 3 constant ($\sqrt{3}$) | 015666365641 | 6ED9EBA1 |

Each of the N/16 sets of three rounds begins with execution of the instruction sequence in Table IV as occurs in block 187, where the value of n denotes the set currently being processed. The sets are indexed by 0 to (N/16)−1.

TABLE IV

Set X[j] to M[n*16 + j], for j = 0, 1, ..., 15.
Save A as AA, B as BB, C as CC, and D as DD.

When execution of hashing algorithm 150 proceeds to block 190 and round one of the hashing occurs, [A B C D i t] denotes the operation $A = (A + f_1(B,C,D) + X[i]) <<< t$. It will be understood by those skilled in the art that $(A <<< t)$ denotes the thirty-two bit value obtained by circularly shifting or rotating A left t bit positions. The operation denoted above generically by [A B C D i t] occurs sixteen times during round one, where the values assumed consecutively by operands A, B, C, D, I, and t respectively are given in Table V.

TABLE V

| [A B C D 0 | 3] |
|---|---|
| [D A B C 1 | 7] |
| [C D A B 2 | 11] |
| [B C D A 3 | 19] |
| [A B C D 4 | 3] |
| [D A B C 5 | 7] |
| [C D A B 6 | 11] |
| [B C D A 7 | 19] |
| [A B C D 8 | 3] |
| [D A B C 9 | 7] |
| [C D A B 10 | 11] |
| [B C D A 11 | 19] |
| [A B C D 12 | 3] |
| [D A B C 13 | 7] |
| [C D A B 14 | 11] |
| [B C D A 15 | 19] |

When execution proceeds to block 195, round two of the hashing algorithm 150 begins. In round two [A B C, D i t] denotes the operation $A = (A + f_2(B,C,D) + X[i] + 5A827999) <<< t$. The operation denoted immediately above by [A B C D i t] occurs sixteen times during round two, where the values assumed consecutively by operands A, B, C, D, i, and t respectively are given in Table VI.

TABLE VI

| [A B C D 0 | 3] |
|---|---|
| [D A B C 4 | 5] |
| [C D A B 8 | 9] |
| [B C D A 12 | 13] |
| [A B C D 1 | 3] |
| [D A B C 5 | 5] |
| [C D A B 9 | 9] |
| [B C D A 13 | 13] |
| [A B C D 2 | 3] |
| [D A B C 6 | 5] |
| [C D A B 10 | 9] |
| [B C D A 14 | 13] |
| [A B C D 3 | 3] |
| [D A B C 7 | 5] |
| [C D A B 11 | 9] |
| [B C D A 15 | 13] |

When execution proceeds to block 197, round three of the hashing algorithm 150 begins. In round three [A B C D i t] denotes the operation $A = (A + f_3(B,C,D) + X[i] + 6ED9EBA1) <<< t$. The operation denoted immediately above by [A B C D i t] occurs sixteen times during round three, where the values assumed consecutively by operands A, B, C, D, i, and t respectively are given in Table VII.

TABLE VII

| [A B C D 0 | 3] |
|---|---|
| [D A B C 8 | 9] |
| [C D A B 4 | 11] |
| [B C D A 12 | 15] |
| [A B C D 2 | 3] |
| [D A B C 10 | 9] |
| [C D A B 6 | 11] |
| [B C D A 14 | 15] |
| [A B C D 1 | 3] |
| [D A B C 9 | 9] |
| [C D A B 5 | 11] |
| [B C D A 13 | 15] |
| [A B C D 3 | 3] |
| [D A B C 11 | 9] |
| [C D A B 7 | 11] |
| [B C D A 15 | 15] |

After round three is complete, execution of hashing algorithm 150 within block 35 of digital signature algorithm 10 proceeds to block 199 wherein the following additions are performed:

A = A + AA
B = B + BB
C = C + CC
D = D + DD

Thus, each of the four registers A, B, C, D which together ultimately form the digest of the received message is incremented by the value it had before the particular set was started.

The message digest produced as the output of hashing algorithm 150 within digital signature algorithm 10 is thus the 4-tuple of values of A, B, C, D obtained in block 199 after processing the last set. The loop induction variable is incremented in block 201 and tested in decision diamond 202. If execution is not complete block 187 is performed again. Otherwise execution of algorithm 150 proceeds to exit terminal 203.

It will be understood by those skilled in the art that more than one hundred twenty eight bits of output may be required in some applications. This may be accomplished, for example, by providing two systems in parallel wherein each of the parallel systems executes hashing algorithm 150 with appropriately chosen constants and initialized registers, in order to provide at most two hundred fifty six bits of final output.

Although an example mode, which includes specification of parameter range restrictions, for carrying out the present invention has been herein shown and described, it will be apparent that modification and variation may be made without departing from what is regarded to be the subject matter of this invention.

I claim:

1. A method for generating a digital signature (r,s) of a message m in a system wherein information is transmitted and received by users of said system, comprising the steps of:
   (a) providing a secret value k unique to said message m;
   (b) providing a public value g;
   (c) calculating said value r proceeding from a prime modulus p and a value g selected to be a prime divisor of p−1 according to the rule $r = (g^k \bmod p) \bmod g;$ (d) applying a hashing transform H only to said message m to generate a transformed message H(m);
   (e) calculating said value s according to the rule $s = f(H(m))$ where said value s is a function of m only by way of said transformed message H(m); and,
   (f) generating a signal representative of said digital signature (r,s) in accordance with said value r and said value s and transmitting said generated signal.

2. The method for generating a digital signature (r,s) of claim 1, wherein step (a) comprises the step of randomly selecting said secret value k.

3. The method for generating a digital signature (r,s) of claim 1, wherein step (b) comprises the step of calculating said value g proceeding from a value h which may be any non-zero integer such that $h^{(p-1)/q}$ is not congruent to 1 mod p according to the rule $g = h^{(p-1)/q} \bmod p.$ 4. The method for generating a digital signature (r,s) of claim 1, wherein step (d) comprises the step of transforming said message m by applying a one-way transform H to said message M.

5. The method for generating a digital signature (r,s) of claim 1, wherein step (e) further comprises the step of calculating said value s according to the rule $s = k^{-1} (H(m) + xr) \bmod g$ wherein said value x is a secret value.

6. The method for generating a digital signature (r,s) of claim 1, wherein steps (a)-(c) are performed prior to knowledge of said message m.

7. The method for generating a digital signature (r,s) of claim 1, comprising the further step of transmitting a signed message formed of said message m and said digital signature (r,s).

8. The method for generating a digital signature (r,s) of claim 7, comprising the further steps
   (g) receiving said transmitted signed message including a received digital signature (r,s) with a received value r and a received value s; and,
   (h) verifying said received digital signature (r,s).

9. The method for generating a digital signature (r,s) of claim 8, wherein step (h) comprises the step of reconstructing said $g^k \bmod p$ of step (c) to provide a recovered $g^k \bmod p$.

10. The method for generating a digital signature (r,s) of claim 9, comprising the step of determining a value v proceeding from a value $u_1 = (H(m))(s)^{-1} \bmod g$ and a value $u_2 = (r)(s)^{-1} \bmod g$ according to the rule $v = (g)^{u_1} (y)^{u_2} \bmod p$ wherein said value y is congruent to $g^x \bmod p$ and said value x is a secret value.

11. The method for generating a digital signature (r,s) of claim 10, comprising the step of determining whether said determined value v after reduction mod q is the same as said received value r.

12. The method for generating a digital signature (r,s) of claim 11, comprising the further step of determining that said received digital signature (r,s) is verified in response to determining that said determined value v after reduction mod q is the same as said received value r.

13. The method for generating a digital signature (r,s) of claim 8, wherein step (h) further comprises the step of determining whether said received value r is congruent to 0 mod g.

14. The method for generating a digital signature (r,s) of claim 8, wherein step (h) further comprises the step of determining whether said received value s is congruent to 0 mod g.

15. A system for generating a digital signature (r,s) of a message m wherein information is transmitted and received by users of said system, comprising:
   a secret value k unique to said message m;
   a public value g;
   transform means for applying a hashing transform H only to said message m to generate a transformed message H(m);
   means for calculating said value r proceeding from a prime modulus p and a value q selected to be a prime divisor of p−1 according to the rule $r = (g^k \bmod p) \bmod q;$ means for calculating said value s according to the rule $s = f(H(m))$ where said value s is a function of said message m only by way of H(m);
   generating means for receiving said calculated values of r and s and generating a signal representative of a signed message formed of said message m and said digital signature (r,s); and,
   transmitting means for transmitting said generated signal.

16. The system for generating a digital signature (r,s) of claim 15, wherein said secret value k is randomly selected.

17. The system for generating a digital signature (r,s) of claim 15, wherein said public value g is calculated proceeding from a value h which may be any non-zero integer such that $h^{(p-1)/q}$ is not congruent to 1 mod p according to the rule $$g = h^{(p-1)/q} \bmod p.$$

18. The system for generating a digital signature (r,s) of claim 15, wherein said transform means comprises one-way transform means for transforming said message m by applying a one-way hashing transform H to said message m.

19. The system for generating a digital signature (r,s) of claim 15, wherein a value x is a secret value and said value s is calculated according to the rule $$s = k^{-1}(H(m) + xr) \bmod q.$$

20. The system for generating a digital signature (r,s) of claim 15, wherein said values k, g, and r are determined independently of said message m.

21. The system for generating a digital signature (r,s) of claim 15, further comprising:
means for receiving said transmitted signed message; and,
verifying means for verifying said digital signature (r,s).

22. The system for generating a digital signature (r,s) of claim 21, wherein said verifying means further comprises means for reconstructing said $g^k$ mod p to provide a recovered $g^k$ mod p within said verifying means.

23. The system for generating a digital signature (r,s) of claim 22, further comprising means for determining a value v proceeding from a value $u_1 = (H(m))(s)^{-1} \bmod q$ and a value $u_2 = (r)(s)^{-1} \bmod q$ according to the rule $$it\ v = (g)^{u_1}(y)^{u_2} \bmod p$$

wherein said value y is congruent to $g^x$ mod p and said value x is a secret value.

24. The system for generating a digital signature (r,s) of claim 23, further comprising means for determining whether said determined value of v after reduction mod q is the same as said received value r.

25. The system for generating a digital signature (r,s) of claim 24, further comprising means for determining that said signature (r,s) is verified in response to determining that said value v after reduction mod q is the same as said received value r.

26. The system for generating a digital signature (r,s) of claim 21, wherein said verifying means comprises means for determining whether said value r is congruent to 0 mod q.

27. The system for generating a digital signature (r,s) of claim 21, wherein said verifying means comprises means for determining whether said value s is congruent to 0 mod q.

28. A method for generating and verifying a digital signature (r,s) of a message m in a system, comprising the steps of:
(a) providing a secret value k unique to said message m;
(b) providing a public value g;
(c) determining said value r proceeding from a prime modulus p according to the rule $r = F(g^k \bmod p)$ wherein F is a reduction function independent of said message m;
(d) receiving a signed message formed of said message m and said digital signature (r,s);
(e) recovering and isolating $g^k$ mod p in accordance with said message m;
(f) determining whether said isolated $g^k$ mod p after reduction according to said reduction function F is the same as said received value r;
(g) determining that said signature (r,s) is verified in accordance with the determination of step (f); and,
(h) generating a verification signal in accordance with step (g) and transmitting said verification signal.

29. The method for generating and verifying a digital signature (r,s) of claim 28, wherein step (b) comprises calculating said value g proceeding from a value h which may be any non-zero integer such that $h^{(p-1)/q}$ is not congruent to 1 mod p according to the rule $$g = h^{(p-1)/q} \bmod p$$

said value q being selected to be a prime divisor of p−1.

30. The method for generating and verifying a digital signature (r,s) of claim 28, wherein step (a) comprises randomly selecting said secret value k.

31. The method for generating and verifying a digital signature (r,s) of claim 29, wherein said reduction function F comprises reduction mod q.

32. The method for generating and verifying a digital signature (r,s) of claim 29, further comprising the step of determining a value v proceeding from a value $u_1 = (H(m))(s)^{-1} \bmod q$ and a value $u_2 = (r)(s)^{-1} \bmod q$, according to the rule $$v = (g)^{u_1}(y)^{u_2} \bmod p$$

where said value y is congruent to $g^x$ mod p and said value x is a secret value.

33. The method for generating and verifying a digital signature (r,s) of claim 29, further comprising the step of calculating said value r proceeding from a prime modulus p, according to the rule $$r = (g^k \bmod p) \bmod q$$

prior to knowledge of said message m.

34. The method for generating and verifying a digital signature (r,s) of claim 28, further comprising the step of calculating said value s according to the rule $s = f(H(m))$ where H is a hashing transform for producing a transformed message H(m) and said value s is a function of m only by way of said transformed message H(m).

35. The method for generating and verifying a digital signature (r,s) of claim 34, comprising the step of transforming said message m by applying a one-way transform H to said message m.

36. The method for generating and verifying a digital signature (r,s) of claim 29, further comprising the step of calculating said value s according to the rule $$s = k^{-1}(H(m) = xr) \bmod q$$

wherein said value x is a secret value.

37. The method for generating and verifying a digital signature (r,s) of claim 36, comprising the step of determining $k^{-1}$ prior to knowledge of message m.

38. The method for generating and verifying a digital signature (r,s) of claim 28, wherein steps (a)-(c) are formed prior to knowledge of said message m.

39. The method for generating and verifying a digital signature of claim 36, comprising the further step of transmitting a signed message formed of said message m and said digital signature (r,s) proceeding from said calculated value of s.

40. The method for generating and verifying a digital signature (r,s) of claim 29, wherein step (g) further comprises the step of determining verification in accordance with a determination whether said received value r is congruent to 0 mod q.

41. The method for generating and verifying a digital signature (r,s) of claim 29, wherein step (g) further comprises the step of determining verification in accordance with a determination whether said received value s is congruent to 0 mod q.

42. The method for generating and verifying a digital signature (r,s) of claim 5, wherein $k^{-1}$ is determined prior to knowledge of said message m.

43. The system for generating and verifying a digital signature (r,s) of claim 19, wherein $k^{-1}$ is determined prior to knowledge of said message m.

44. A system for generating and verifying a digital signature (r,s) of a message m wherein information is transmitted and received by user of said system, comprising:

a secret value k unique to said message m;

a public value g;

means for determining said value r proceeding from a prime modulus p according to the rule $r = F(g^k \bmod p)$ wherein F is a reduction function independent of said message m;

means for receiving a signed message formed of said message m and said digital signature (r,s);

means for recovering and isolating $g^k \bmod p$ in accordance with said message m;

comparison means for determining whether said isolated $g^k \bmod p$ after reduction according to said reduction function F is the same as said received value r;

verification means for determining that said signature (r,s) is verified in accordance with the determination of said comparison means;

means for generating a verification signal in accordance with the verification of said verification means; and, means for transmitting said verification signal.

* * * * *